L. V. JOHNSON & O. H. BENSON.
MACHINE FOR MAKING CAKE CONTAINERS.
APPLICATION FILED MAY 7, 1917.

1,288,018.

Patented Dec. 17, 1918.
4 SHEETS—SHEET 1.

Witnesses.
Porter H. Plautt
Alice G. Donegan

Inventors
Leonard Verner Johnson
Otis Harper Benson
By Edwin T. Cammel
Attorney

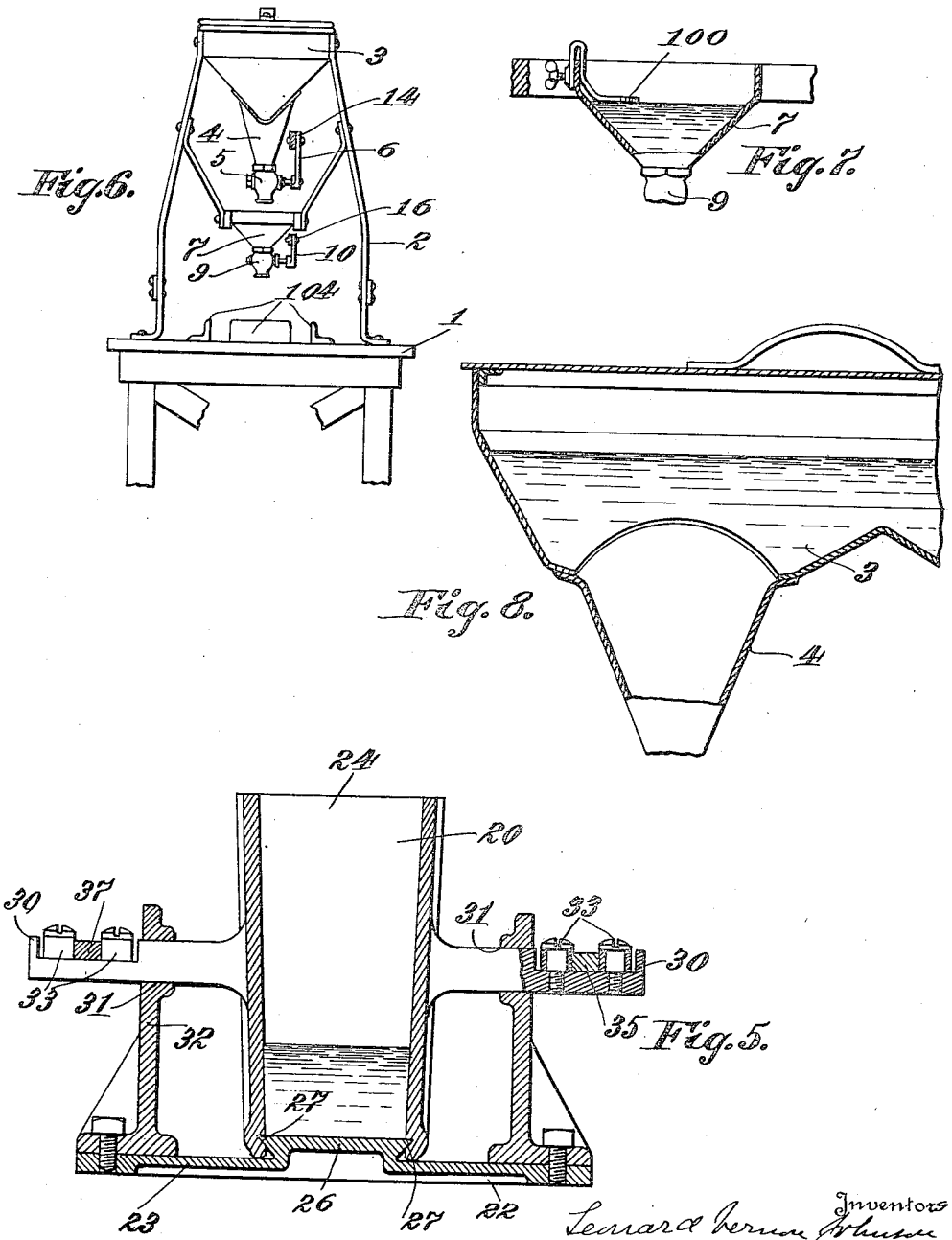

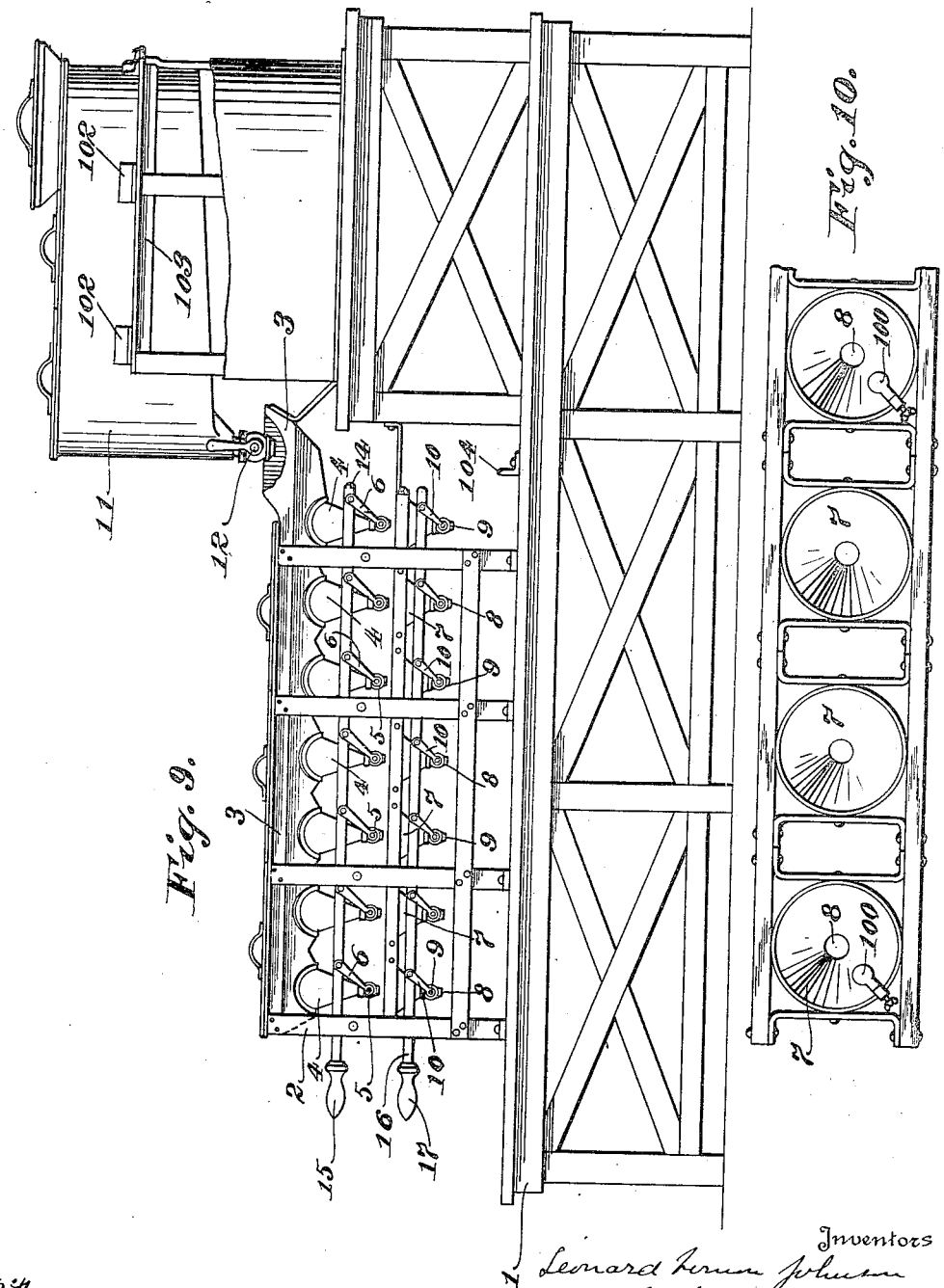

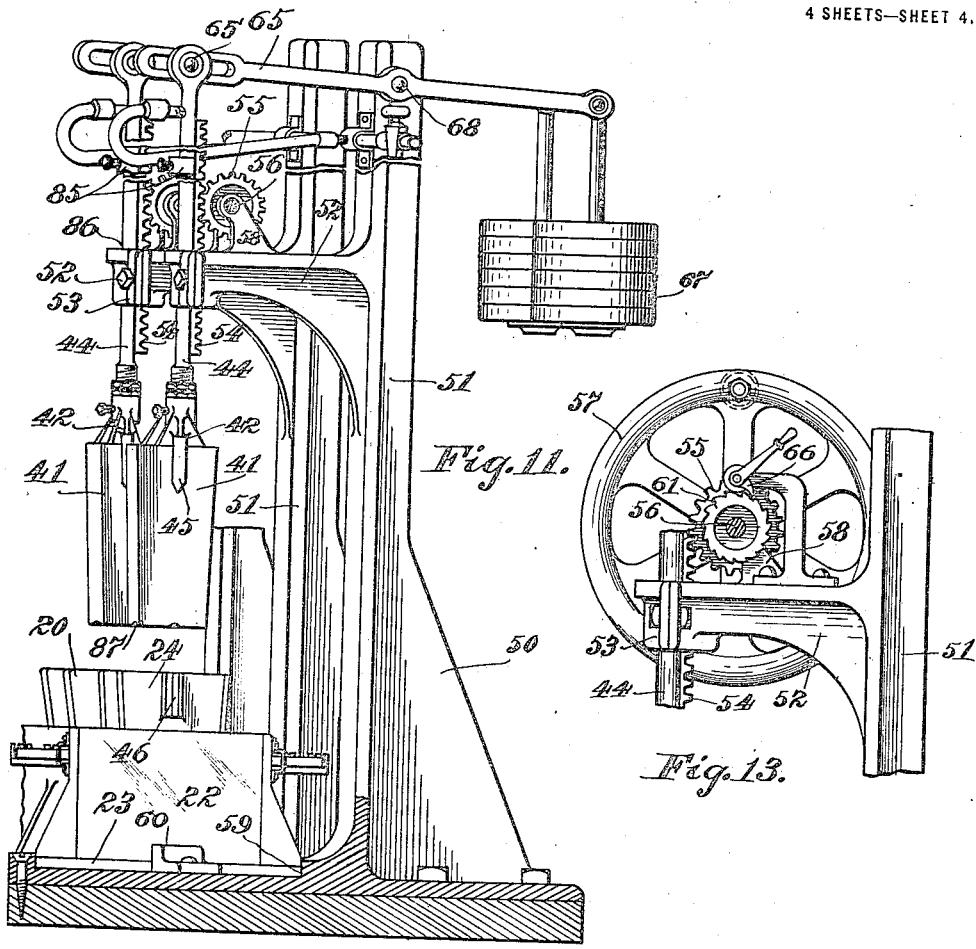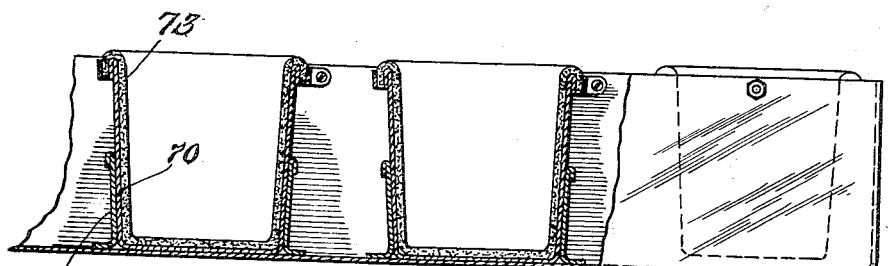

UNITED STATES PATENT OFFICE.

LEONARD VERNON JOHNSON AND OTIS HARPER BENSON, OF ST. MICHAELS, MARYLAND.

MACHINE FOR MAKING CAKE CONTAINERS.

1,288,018.

Specification of Letters Patent.

Patented Dec. 17, 1918.

Application filed May 7, 1917. Serial No. 166,861.

*To all whom it may concern:*

Be it known that we, LEONARD VERNON JOHNSON and OTIS HARPER BENSON, citizens of the United States of America, and residents of St. Michaels, Talbot county, State of Maryland, have invented certain new and useful Improvements in Machines for Making Cake Containers, of which the following is a specification.

This apparatus is intended to produce the cake container or square cone for ice cream described in United States Patent No. 1,214,168.

The apparatus consists principally of molds and means for operating them, means for measuring the batter for the molds and filling them, formers and means for heating them from within, and means for operating the formers and greasing the molds.

In the accompanying drawings, we have illustrated an apparatus embodying the various features of our invention.

Fig. 5 is a section at right angles to Fig. 1 and on the line 5, 5, showing the details of an external mold;

Fig. 6 is an end elevation of the batter measuring and filling apparatus, certain parts being shown in section;

Fig. 7 is a section through one of the measuring chambers;

Fig. 8 is a longitudinal section showing one of the delivery outlets of the batter trough;

Fig. 9 is an elevation showing the batter tank, trough, valves and measuring receptacles;

Fig. 10 is a plan of the measuring receptacles or four units thereof, the remainder of the receptacle and frame being broken away;

Fig. 11 is an elevation showing the internal molds and means for supporting and operating the same;

Fig. 12 is an elevation showing means for greasing the internal molds; and

Fig. 13 is a detail of the former-driving mechanism.

Figures 1, 2, 3, 4:
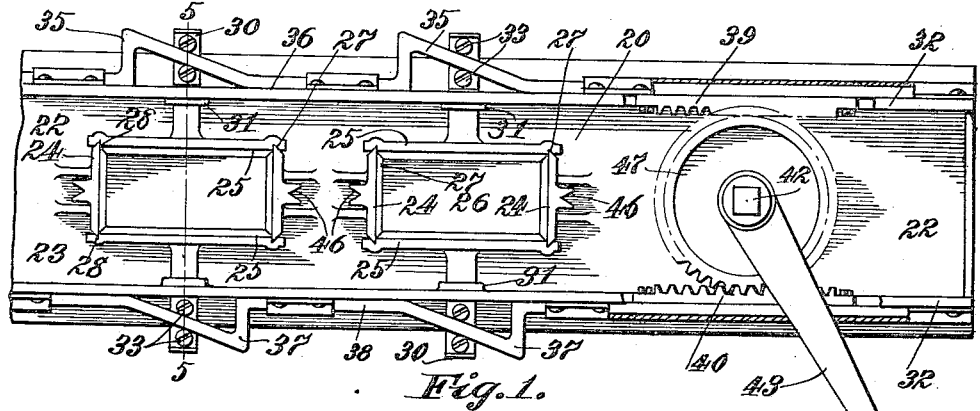
Figure 1 shows the frame carrying the external molds and mechanism for operating the molds, the frame being broken away for convenience in illustration.
Fig. 2 is an elevation of the same, likewise broken away.
Fig. 3 is a vertical section through an internal mold showing the gas burner in elevation.
Fig. 4 is a view of the bottom of the internal mold.

Referring to the drawings by numerals, the apparatus includes a supporting table or bench 1 on which is a frame 2 bearing a trough 3 for the batter. The trough has a number of delivery ducts 4 each of which is controlled as to its outlet by a plug valve or spigot 5, the plug being provided with a radial arm 6 by means of which it may be turned from open to closed position and vice versa. Beneath each spigot is a measuring chamber 7 shown as conical in form tapering to an outlet opening 8 controlled by a plug valve or spigot 9 operated in each instance by a radial valve lever 10. It will be understood that there are a plurality of delivering valves 5 and a plurality of measuring valves 9 each comprising a set and corresponding to the number of molds in a set, as hereinafter described, to be filled at one time. In the present machine we have shown a set comprising seven of what may be termed the molding and baking units.

Batter is supplied to the trough from a tank 11 provided for this purpose, the same having a spigot 12 over the end of the trough 3. In operation, the valves 5 are opened and closed simultaneously by means of a single connecting rod 14 to which each of the valve levers 6 is pivoted, the connecting rod having a handle 15 to be manually engaged by the operator to operate the seven valves simultaneously. The valves 9 are likewise simultaneously operated by means of a connecting rod 16 to which each of the valve levers 10 is connected at its swinging end, the connecting rod 16 having a handle 17 at its far end.

To coöperate with the measuring and filling apparatus shown in Figs. 6, 7, 8 and 9, we provide external molds 20 arranged in sets, the molds of each set being equal in number to the number of units of the filling and measuring apparatus, the molds of each set being supported on a frame 22 on which they are arranged according to the arrangement of the filling and measuring units.

The frame 22 consists of a rigid longitudinal member 23 with which the ends 24 and bottom portions 26 of the mold are formed integral. The sides 25 which are movable into and out of the coöperative relation with the other parts of the molds as hereinafter described, are provided with grooves 28 to receive the beveled edges 27 of the stationary members.

As has been pointed out, the end and bottom members are stationary but the side members are mounted to move to and from the stationary members and for this purpose they are provided with shanks 30 extending outward substantially at right angles to the sides passing through guide slots 31 in uprights 32 on the frame 22, the same being rigidly secured to the longitudinal member 23. In the form of the invention shown, the shanks 30 are provided each with a pair of rollers or cam followers 33. The followers on each shank on one side of the molds coöperate in double contact with corresponding cams 35 carried by a sliding rod 36 common to all the cams on that side of the frame, the cams 37 on the opposite side being oppositely disposed and carried by a rod 38 likewise mounted to slide and preferably parallel to the rod 36. The members 25 on the opposite side are actuated by cams 35. Each of the rods 36 and 38 is provided with a section of racks 39, 40 coöperating with a toothed pinion 47 mounted on the frame on a suitable shaft 42 carrying a crank 43 by which it may be manually operated. It will be apparent that when the crank is rotated in right-handed phase, the rod 36 is moved to the right in Fig. 1 and the rod 38 to the left withdrawing the side members 25 of the mold and when the crank is rotated in the opposite direction, the rod 36 is pulled to the left and the rod 38 to the right, returning the mold parts to closed position.

In Fig. 3 we have shown an internal mold or former 41, the same being of form and dimensions to fit the external mold leaving a surrounding gap or space inside the external mold and outside the internal mold to accommodate the volume of batter required to form a cone or cake container. These molds or formers as shown, are hollow and provided each with a central bracket 42 to which, in the form of the invention shown, is secured a depending gas jet or other heater 43, the supporting or piston rod 44 being likewise secured to the bracket and preferably made hollow to serve as a fuel pipe for the burner. The internal mold or former 41 may also be provided with ears to serve as guides. These ears 45 coöperate with corresponding guides 46 on the external molds, see Figs. 1 and 2, the guide 46 being shown at each end of the molds in the form of vertically extending V-shaped grooves, the ears 45 being of corresponding cross-section and correspondingly disposed to engage the grooves 46.

The internal molds 41, preferably equal in number to the number of external molds in a set, are mounted on a rigid frame 50, see Fig. 11. This frame consists of uprights 51 supporting horizontal arms 52 carrying the bearings 53 for the shanks or piston rods 44 of the internal molds or formers 41. Each shank 44, as illustrated, is provided with rack teeth 54 of width less than the diameter of the shank 44 so as not to interfere with the guiding action of the bearing 53. The arm 52 carries a bracket to support the pinion 55 mounted on the shaft 56. The pinions 55 are in number equal to the number of internal formers or molds. One engages rack teeth on each shank 44 and the shaft extends the length of the series of formers or molds carrying all the pinions 55. At one end, the shaft is provided with a suitable crank 57 and the shaft takes its bearing in ears 58 on the arms 52. In the operation of the internal formers or molds, a set of external molds, containing sufficient of the batter, is placed beneath the formers which are run up for this purpose, the base plate 23 being brought into engagement with the stops 59 and 60 in order to position the molds in alinement with the formers and by rotation of the crank in right-handed direction, as seen in Fig. 13, the formers are forced into the mold causing the batter to be suitably distributed. At bottom position the formers are allowed to dwell for a short period to bake the cones or cakes, or bake them sufficiently to permit the formers to be withdrawn. For this purpose the former is heated from within by gas. As the weight of the set of internal molds is considerable, they may be counterbalanced or partially counterbalanced leaving a slight downward tendency of the formers due to gravity. This counterbalancing is accomplished by a slotted lever 65 engaging a pin 65' on the upper end of the shank 44 of one of the formers, the lever 65 carrying a weight 67 on the opposite side of an intermediate pivot 68 on the frame. A pawl 66 engaging a ratchet 61 on shaft 56 serves to hold the formers in any position.

Greasing of the external molds is accomplished by an apparatus similar to that of Fig. 11, using greasing members instead of the formers. In Fig. 12 we have shown a device for greasing the internal molds in the form of boxes 70 in sets carried by a frame 71 and positioned to correspond to the formers. These boxes are provided each with an absorbent lining 73 to receive and distribute the grease. To grease the formers, they are run into the boxes and withdrawn.

The frame 22 is independent of the supporting table 1 and is placed on this table beneath the batter depositor by any suitable means, being in the present apparatus handled by the operator. It is accurately positioned beneath the valves 9 by means of the gagers or stops 104. After the molds 20 have been charged with batter, the frame supporting these molds is placed beneath the formers or internal molds, being accurately centered by the lugs or guides 59, 60, that is, the molds are mounted upon a frame so that the series are held in rigid relation corresponding to the relation to each other of the valves 9 and the plungers, so that they may be brought into relation successively with these members and heated by any convenient means to complete the operation.

In operation, the tank 11, which as indicated in Fig. 9 is made removable so that it can be cleaned and recharged conveniently being provided for this purpose with ears 102 on the sides engaging a U-shaped support 103 on the table, is filled with batter, the valves 5 are closed, the valve 12 is opened, and the troughs 3 filled with enough batter for one making or charge. Then the valve 12 is closed, the valves 9 likewise closed, and the valves 5 opened permitting sufficient of the batter to flow into each measuring chamber to make one cone or cake. In order that the amount may be indicated with certainty, the measuring chambers are provided with a gage or marker 100, see Fig. 7, the lower surface of which is just wetted with the batter when the requisite amount has been drawn. At this time, or at the beginning of the operation, a set of external molds 20 on the frame 22 is placed in registration with the valves 9 of the measuring chambers, the gages or stops 104 being provided to assist in locating the frame 22 with due precision. When the external molds have been filled, the valves 9 having preferably first been closed, they are removed from beneath the measuring chambers and placed beneath the internal molds 41, being positioned by gages or stops 59, 60, see Fig. 11. The shaft 56 is then rotated in left handed phase by means of the crank 57, and the pistons or internal molds 41 are forced down into the external molds until they reach the position at which the batter is evenly distributed, this position being determined by means of a stop 85 on the shaft 44, coming in contact with a shoulder or stop surface 86 on the bearing 53 or arm 52.

The internal mold is also positioned by means of the ears or followers 45 on the internal former, engaging the guides 46 on the external mold.

In this connection, the formation of the bottom surface 87 of the internal former should be noted, the same being grooved, see Fig. 4, to form rims or ridges on the internal surface of the bottom of the cone or cake container, which ridges serve to keep the ice cream block from resting directly on the bottom of the container, providing an air space and thereby deferring the melting of the ice cream block.

When the formers are in position in the molds with the batter distributed in the form to be taken by the cake container, the pawl 66 is thrown into engagement with the teeth of ratchet 61 locking the shaft 56 and the internal formers in position. The formers are heated by the gas burners 43 or otherwise and by permitting them to dwell in the position thus described, the cake is baked sufficiently to permit the formers to be withdrawn. The external baking may be either accomplished simultaneously by suitable means, heating the external molds from without, or the formers being withdrawn, the entire set of molds may be removed and placed in an oven to complete the baking. When this has been accomplished, the frame 22 being in convenient position and removed from the oven, if oven baking has been resorted to, the shaft 42 is rotated in right-handed rotation, the cams 35 and 37 being actuated to withdraw the sides 25 of the molds when the cakes are easily removed.

As already pointed out, the molds are thoroughly greased before the batter is introduced, so that the baked cakes, being inclined to shrink, do not adhere closely to the walls. If there are any irregularities on the surface of the cake, these are made by corresponding irregularities on the movable walls, so that the stationary walls are perfectly smooth. After baking of the cakes, the walls 25, which, it will be noted, are the walls of the greatest area, are withdrawn, leaving the cakes supported by the end walls 24 on the bottom of the mold. From these the cakes are easily detached by lateral pressure with any convenient instrument or with the hand.

The greasing operation has been sufficiently described in connection with the description of the apparatus. The formers may be greased by merely running them into a box of cotton waste or the like suitably saturated, or into boxes of formation corresponding to the internal molds, the same being lined with felt saturated with grease, as shown in Fig. 12.

We have thus described our invention specifically and in detail in order that its nature and operation may be clearly understood; however, the specific terms herein are used descriptively rather than in their limiting sense and the scope of the invention is defined in the claims.

We claim:

1. In an apparatus for molding and baking cake containers having flat side walls, a series of external molds, a support therefor, a plurality of the walls of each mold being separate and movable relatively to the other walls of the mold, and means for moving the first said walls toward and from the other walls of the mold.

2. In an apparatus for molding and baking cake containers for ice cream, the same being rectangular in cross section, a series of external molds, a support therefor, the end and bottom walls of each mold being formed and rigid with the support, movable sides for the molds, and means for moving the sides of each mold into and out of closed relation with the mold.

3. In an apparatus for molding and baking cake containers for ice cream, a series of external molds, a support therefor, a portion of each mold being formed rigid with the support, movable sides for the molds formed to coöperate with the stationary portions of said molds and adapted to move into and out of closed relation with such stationary portions, and means for moving the sides of each mold into and out of closed relation with the mold, the movement of the corresponding parts of the different molds being simultaneous.

4. In an apparatus for molding and baking cake containers for ice cream, a series of molds, a rigid movable frame therefor, the molds being made in sections, means on the frame for moving the sections into open and closed relation, a filling and measuring apparatus with a support to receive the frame with the molds thereon, the filling apparatus having filling nozzles corresponding in number to the molds and correspondingly arranged to register with the molds, a series of internal formers with a support therefor, the formers being arranged to register with the molds on the frame and corresponding in number to the molds, means for advancing and retracting the formers, and means for positioning the external mold support in registration with the formers.

5. In an apparatus for molding and baking cake containers for ice cream, the same being of rectangular cross-section, a series of external molds, a support therefor, each mold being composed of stationary portions including two upright walls secured to the support and a movable portion including two upright walls, a cam follower on each movable part, a series of cams one for each movable part of each mold, the cams being connected to move together, and gearing for operating said cams to open and close the molds.

6. In an apparatus for molding and baking cake containers, a series of molds, a support therefor to which the molds are secured, a series of internal formers in number corresponding to the number of molds and correspondingly placed, a support therefor, stops to position the mold support beneath the formers, means for advancing and retracting the formers simultaneously, and means for heating them from within.

7. In an apparatus for molding and baking cake containers for ice cream, a series of molds of rectangular cross-section, a single unitary support therefor, each mold having two sides movable relatively to the support and the remaining walls fixed to the support, means for moving the two movable walls into and out of coöperative relation with the remainder of the mold, a series of internal formers corresponding to the molds, a support therefor, and stops in fixed relation to the support for positioning the molds relatively thereto.

8. In an apparatus for molding and baking cake containers for ice cream, a series of molds of rectangular cross-section, a single unitary support therefor, each mold having two sides movable relatively to the support and the remaining walls fixed to the support, means for moving the two movable walls into and out of coöperative relation with the remainder of the mold, the said means consisting of an arm on each movable wall, a guide therefor on the support and means for advancing and retracting the arm through the guide bringing the movable walls into and out of coöperative relation with the remainder of the mold.

9. In an apparatus for molding and baking cake containers for ice cream, a series of molds of rectangular cross-section, a single unitary support therefor, each mold having two sides movable relatively to the support and the remaining walls fixed to the support, means for moving the two movable walls into and out of coöperative relation with the remainder of the mold, said means consisting of an arm projecting from each wall, followers thereon and a cam engaging the followers of each arm to advance and retract the same, opening and closing the mold.

10. In an apparatus for molding and baking cake containers for ice cream, a series of molds of rectangular cross-section, a single unitary support therefor, each mold having two sides movable relatively to the support and the remaining walls fixed to the support, means for moving the two movable walls into and out of coöperative relation with the remainder of the mold, said means consisting of an arm projecting from each wall, followers thereon, a cam engaging the followers of each arm to advance and retract the same, opening and closing the mold, and means for moving the cams to operate the movable walls simultaneously.

11. In an apparatus for molding and baking cake containers for ice cream, a series of molds of rectangular cross-section, a single unitary support therefor, each mold having two sides movable relatively to the support and the remaining walls fixed to the support, means for moving the two movable walls into and out of coöperative relation with the remainder of the mold, said means consisting of an arm projecting from each wall, followers thereon, a cam engaging the followers of each arm to advance and retract the same, opening and closing the mold, and means for moving the cams to operate the movable walls simultaneously, said means being in the form of connecting rods connecting the cams on each side of the mold, rack teeth on the connecting rods and a pinion on the support engaging the rack teeth.

Signed by us at St. Michaels, Talbot county, Maryland, this 28th day of April, 1917.

LEONARD VERNON JOHNSON.
OTIS HARPER BENSON.

Witnesses:
    JOHN P. COSDEN,
    J. FLETCHER FAIRBANKS.